(12) United States Patent
Marshall

(10) Patent No.: US 9,313,649 B2
(45) Date of Patent: Apr. 12, 2016

(54) GSM SIGNALLING FOR M2M COMMUNICATIONS

(71) Applicant: ESEYE LIMITED, Surrey (GB)

(72) Inventor: Paul Marshall, Surrey (GB)

(73) Assignee: ESEYE LIMITED, Surrey (GB)

( * ) Notice: Subject to any disclaimer, the term of this patent is extended or adjusted under 35 U.S.C. 154(b) by 0 days.

(21) Appl. No.: 14/373,427

(22) PCT Filed: Jan. 30, 2013

(86) PCT No.: PCT/GB2013/050208
§ 371 (c)(1),
(2) Date: Jul. 21, 2014

(87) PCT Pub. No.: WO2013/114109
PCT Pub. Date: Aug. 8, 2013

(65) Prior Publication Data
US 2014/0370878 A1    Dec. 18, 2014

(30) Foreign Application Priority Data
Jan. 31, 2012 (GB) .................................. 1201617.6

(51) Int. Cl.
| | | |
|---|---|---|
| *H04M 3/00* | (2006.01) |
| *H04W 8/22* | (2009.01) |
| *H04W 4/00* | (2009.01) |
| *H04W 4/14* | (2009.01) |
| *H04W 52/02* | (2009.01) |
| *H04W 76/04* | (2009.01) |

(52) U.S. Cl.
CPC ................ *H04W 8/22* (2013.01); *H04W 4/005* (2013.01); *H04W 52/0274* (2013.01); *H04W 4/14* (2013.01); *H04W 52/0258* (2013.01); *H04W 76/048* (2013.01); *Y02B 60/50* (2013.01)

(58) Field of Classification Search
CPC .............. H04W 8/22; H04W 52/0274; H04W 52/0258; H04W 4/005; H04W 4/14; H04W 76/048
USPC ............. 455/419, 343.4, 414.1, 343.1–343.6, 455/574, 127.5, 558, 466
See application file for complete search history.

(56) References Cited

U.S. PATENT DOCUMENTS

| | | | |
|---|---|---|---|
| 5,915,225 A * | 6/1999 | Mills ............................. | 455/558 |
| 7,539,484 B2 * | 5/2009 | Roundtree ................ | 455/414.1 |
| 2002/0125998 A1 * | 9/2002 | Petite et al. .............. | 340/286.01 |
| 2003/0073440 A1 * | 4/2003 | Mukherjee et al. ........... | 455/435 |
| 2004/0127238 A1 | 7/2004 | Bianconi et al. | |
| 2004/0236189 A1 * | 11/2004 | Hawthorne et al. ........... | 600/300 |
| 2005/0107100 A1 * | 5/2005 | Gustafsson et al. .......... | 455/466 |
| 2005/0173222 A1 * | 8/2005 | Schwarzli et al. ............. | 194/244 |

(Continued)

FOREIGN PATENT DOCUMENTS

EP    2 299 645    3/2011

*Primary Examiner* — Wayne Cai
(74) *Attorney, Agent, or Firm* — Leason Ellis LLP

(57) ABSTRACT

A remote machine (10) communicates with a server (24). A mobile telecommunications module (14) is used to send a unstructured supplementary services data (USSD) message from the remote machine, and the remote machine then switches off. By polling the server (24), using USSD, the mobile telecommunications module (14) can be kept normally off, saving power.

14 Claims, 2 Drawing Sheets

(56) References Cited

U.S. PATENT DOCUMENTS

| | | | |
|---|---|---|---|
| 2007/0077913 A1* | 4/2007 | Kim | 455/410 |
| 2008/0146268 A1* | 6/2008 | Gandhi et al. | 455/552.1 |
| 2011/0182220 A1 | 7/2011 | Black et al. | |
| 2011/0185010 A1* | 7/2011 | Shatsky et al. | 709/203 |
| 2011/0317673 A1 | 12/2011 | Shelby | |
| 2012/0203909 A1* | 8/2012 | Kavanaugh et al. | 709/226 |
| 2014/0146826 A1* | 5/2014 | Herriot et al. | 370/401 |
| 2014/0335856 A1* | 11/2014 | Marshall et al. | 455/433 |

* cited by examiner

GSM SIGNALLING FOR M2M COMMUNICATIONS

CROSS REFERENCE TO RELATED APPLICATIONS

The present application is a U.S. National Phase of International Patent Application PCT/GB2013/050208, filed Jan. 30, 2013, which claims priority to GB Patent Application No. 1201617.6, filed Jan. 31, 2012, each of which is incorporated herein by reference in its entirety.

There is a general need to communicate data between a remote machine and a server.

Remote machines can be located at inconvenient locations for wired links and so mobile telephone communications links may be used for connecting the remote machine to the server. The server may be a database to store data from the machines, or a computer allowing a user to set controls allowing a user to determine how the machines operate, and the remote machine may include a GSM modem which sets a switched circuit or a GPRS/3G data connection to the server to send and receive data.

Alternatively, the GSM modem may send a text message to the server or receive a text message to communicate with the server.

However, many applications of remote machines are low power applications and there is a need to keep the electrical power consumed by the remote machine to an absolute minimum, especially since GSM modems use a relatively high amount of power.

Furthermore data connections require resources on the mobile network to be reserved during the duration of the session and this may be an annecessary use of resources.

Note that exactly the same issues will apply to 3G, 3.5G or other mobile telephony communications standards, and in this description the term "GSM" is intended to include such developments, also GSM includes the USSD protocol, however CDMA includes equivalent signalling channels and the invention is intended to include these developments in CDMA as well as in GSM.

According to the invention there is provided a method according to claim 1 and apparatus according to claim 9.

By using the signalling channel, for example an unstructured supplementary services data (USSD) channel, the signalling load can be kept to the minimum. There is no need to set up any form of data link between the remote machine and the server, and this significantly reduces the overhead on both the apparatus and the mobile network.

The use of the USSD channel gives particular benefits when the remote machine is not operating in its home network, since international signalling through USSD is both rapid and bidirectional Note that conventionally USSD signalling is used to communicate messages between a conventional mobile telephone and the USSD centre and associated server, for example with menu information or balance information regarding the user's current balance with the service provider.

The inventors have realised that the USSD channel can be used immediately the modem in the remote machine is registered on the network. This is significantly less time than is taken to establish a GPRS or 3G data connection after switching on the modem, which can take tens of seconds. Thus, the necessary communication can take place using the USSD channel and then the modem can deregister and turn off, unless a large amount of data transfer is required, in which case a suitable link can be set up and used for the data transfer. Thus, by using the signalling channel such as USSD, the time needed to power the modem is minimised, and hence the electrical power consumed by the remote machine is likewise minimised.

Furthermore this has the advantage on only setting up an active data channel if there is actually data to transfer, thereby only consuming network resources when absolutely necessary.

Note also that the modem is not normally on and it is only switched on from time to time, by the remote machine itself. There is no need to consume power to keep the modem powered up and registered on the network to allow the modem to receive incoming text messages or data transfer requests when server wishes to send a message.

An added advantage of this invention is it allows for a device to report the failure to establish a successful data link. It is possible the local network is experiencing connectivity problems or indeed does not support a full range of protocols.

For a better understanding of the invention embodiments will now be described, purely by way of example, with reference to the accompanying drawings, in which.

Like or similar components are given the same reference numbers in different embodiments, and the description relating thereto is not necessarily repeated. The drawings are schematic and not to scale.

Figure 1:
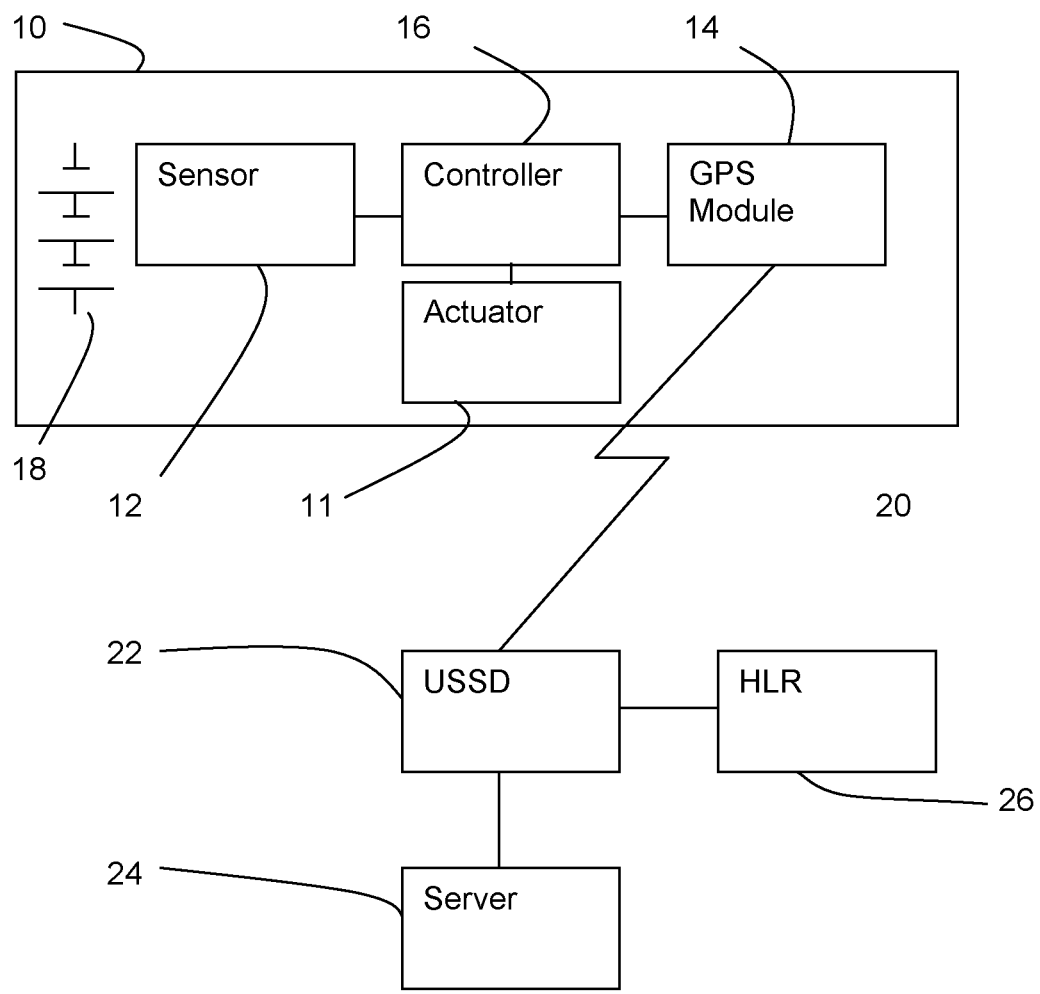
FIG. 1 is a schematic drawing of an embodiment of the invention.

In a first embodiment of apparatus according to the invention, the remote machine 10 (also referred to as remote apparatus) comprises a sensor 12, a wireless modem 14 and a controller 16. The remote machine 10 is powered by battery 18. The sensor 12 acts to capture data. An actuator 11 is also provided for driving an external device, for example a valve or other controlled device.

The mobile telephony network 20 has a USSD centre 22, used to process USSD messages. In the embodiment, the network is a GSM network and in accordance with GSM standards, the USSD centre is associated with each user's home network, so if a remote machine is roaming any USSD messages from a remote machine will be passed to the appropriate USSD centre with the home network. A home location register 26 records the location of devices. The USSD centre 22 is in communication with a server 24 that runs applications software supporting the remote machine and the sensor. In particular, the server 24 may be arranged to collect, collate and output data captured by one or more remote sensors.

In use, in a first embodiment of a method according to the invention, the sensor 12 captures data and the controller 16 needs to send this back to the server 24. To do this, the controller 16 switches on the modem 14. As soon as the GSM modem is registered on a remote network, the controller 16 causes a USSD message to be sent including in the message a small amount of payload data, the data captured by the sensor 12.

In this first embodiment of a method, the controller 16 switches off the GSM modem as soon as the USSD message has been sent.

In an alternative, second embodiment of the method, using like apparatus programmed to operate in accordance with the second embodiment, the controller leaves the modem 14 switched on and waits for an acknowledgement message. When the server 24 receives the data, it replies back with an acknowledgement message sent from the USSD server 22 to the modem 14 through the USSD channel. On receipt of the acknowledgement message, the controller 16 switches the modem 14 off.

The method according to the second embodiment increases the reliability somewhat compared with the first embodiment but does consume a little more electrical power.

Figure 2:
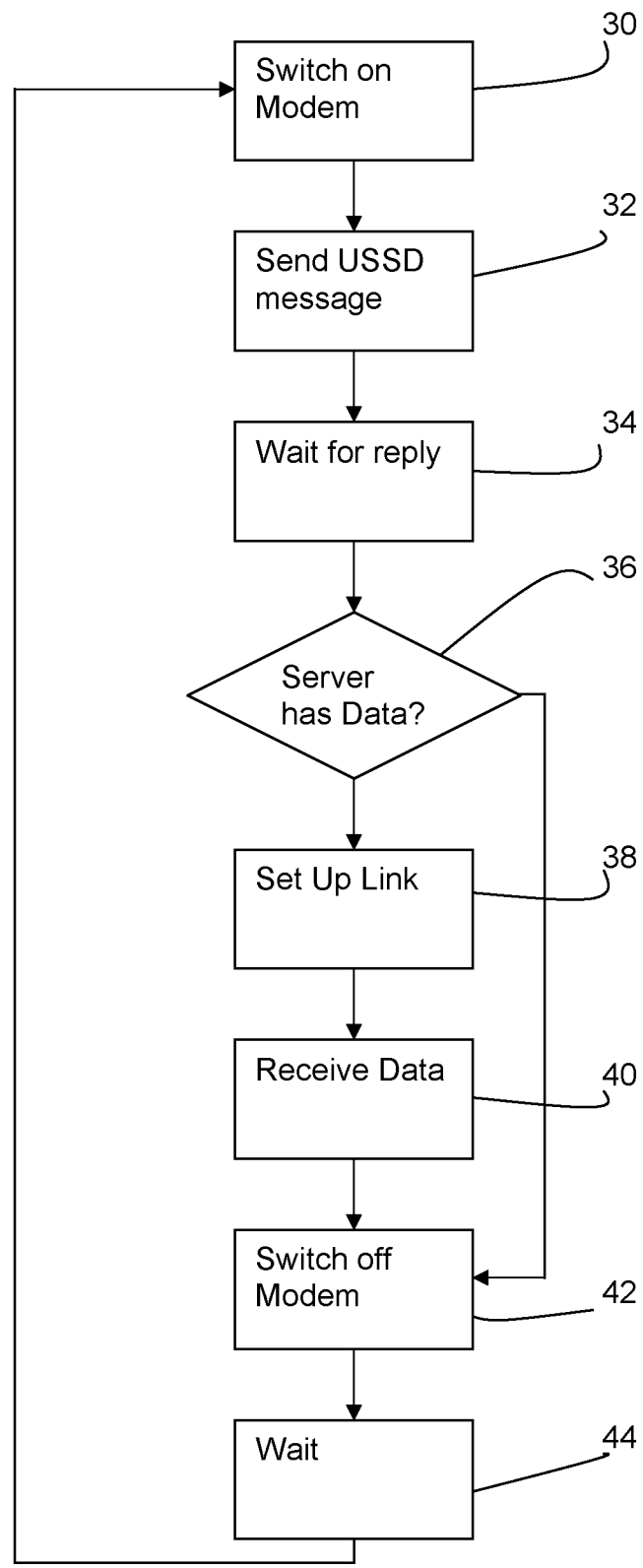
FIG. 2 is a flow diagram of a method according to an embodiment of the invention.

In a third embodiment of a method of the invention, described with reference to FIG. 2, the apparatus again has the same underlying structure, but in this case data is transmitted from the server 24 to the remote machine 10.

The controller 16 switches the modem 14 on (step 30) and causes it to send (step 32) a query USSD message to the server 24. The remote machine 10 then waits (step 34) for a response USSD message from the server.

The server 24 replies with a response USSD message indicating whether or not the server has data to send back to the remote machine 10. This is tested (step 36)—if the response USSD message indicates that the server has no data, the controller switches the modem 14 off.

If the server 24 has only a minimal amount of data to send, it may send it within USSD message.

If, on the other hand, the server 24 has a significant amount of data it may indicate in the USSD message that the controller in the machine is to instruct the modem to set up a conventional data link (Step 38) between the remote machine 10 and server 24, for example using a GPRS or 3G data connection, and transfers the data (Step 40) that way.

When the data transmission is complete, the controller 16 switches the GSM modem off again (step 42). The remote machine then waits (step 44) until it is time to query the server again.

Note that the response USSD message may optionally include a time indication generated by the server 24. This time indication is the time that the server 24 requests that the remote machine 10 next checks with the server for additional data. The time indication may optionally also include the current time at the server to enable the synchronisation of the remote devices clock. The remote machine then waits for the indicated time before sending the next query message to the server 24. By supplying the indicated time, the server 24 can schedule a number of remote machines 10 to query it at different times thereby reducing the risk of server overload.

Alternatively, the remote machine can merely power up the modem 14 periodically.

A further aspect is as follows. When the controller 16 switches on the device, it registers to the network and sends a signal with location information to the home location register (HLR) 26. In this aspect, the HLR 26 sends a message to the server 24 which checks whether data is to be provided from server 24 and if so server 24 sends a network originated USSD message to the modem.

This greatly reduces the time between the sending of the USSD message in step 32 and waiting for a reply since the process of collecting data for the reply message received in step 34 can be collected at server 24 and the message sent even before the USSD message is received at the server 24. This delivers real power saving and network loading advantages since the modem does not have to wait for data using network resources or wait for the round trip time. Instead, the incoming reply message of step 34 will be delivered as soon as possible after the device has connected.

The remote machine (10) may include the actuator 11 (FIG. 1) and the data sent from the server (24) to the remote machine can actuate the actuator 11, for example to turn a valve off or on or to carry out any other control function.

Thus, the modem needs to be kept on for a shorter period and so significant power savings are achieved.

Although the first, second and third methods have been presented separately, in fact apparatus according to the invention may typically be programmed to be capable of implementing all three of these methods as required.

Thus, in particular, the query message sent in step 32 of the third embodiment above may be the same message as the USSD message sent with payload data in the first embodiment, i.e. the message with data acts as a query message. In this case, the remote apparatus only searches for data on the server messages when it itself sends data.

In an alternative case, the remote apparatus may search for data on the server at intervals if no data has been sent back in the interval. In this case, the query message includes data when data is available but the query message is sent with no data when no data is available.

The invention is of particular use for communicating with very low power remote sensors, such as those powered by batteries, which may periodically collect data but which need to keep the power used to power the modem to the absolute minimum by keeping the time that the modem is switched on likewise to the absolute minimum.

The invention also provides a method of minimising the load on the local mobile network, and the local mast, through only establishing a data link when absolutely necessary.

The embodiment described above describes a sensor 12 for automatic data capture, but other forms of data capture are alternatively possible. For example a card reader may be provided instead for data capture as well as or additionally to the sensor.

The remote machine therefore may be in particular a low power device for sensing or logging, for use in particular in sensing events or logging events. For example, the remote machine may record environmental data periodically. The remote machine may also be used to log presence—it may for example be a remote card reader that logs the presence of members of a workforce at remote sites by reading cards carried by the members of the workforce.

The remote machine when it includes an actuator may be used to "wake up" another device or to trigger the collection of another sample. For example, the remote machine may be configured to open a valve into a sample chamber to collect another sample that can then be measured and a message returned through the mobile telephony network.

One suitable application includes location systems e.g. GPS systems where the remote sensor reports location at intervals, and the response from the server may include if required ephemeris data. Another application may be vending systems reporting status, or tank monitoring systems reporting fuel remaining for example in standby generators, service stations, or petrol pumps indicating operating status. The application also includes cold chain management systems. Another example of application is traffic management such as dynamic signage. The approach of the invention can also be used in battery operated equipment for polling for configuration and/or firmware updates.

Although the invention has been described with regard to specific embodiments above, those skilled in the art will realise that many changes are possible.

For example, although the above embodiment uses a GSM modem 14, any modem of any standard that supports USSD messages may be used, for example a 3G modem.

FIG. 1 shows a single server 24 and a home location register 26 but those skilled in the art will realise that these may be networked with many other components including computers, data storage devices, routers and network connectors.

The exact nature of the messages transferred may also be varied.

Where a data link is set up, any convenient means of transferring data may be used. For example, instead of setting up a data link when the server 24 sends a reply USSD message indicating that the server has data to transfer to the remote device 10, a SMS message may be sent by the server 24 to the remote device instead, carrying the data.

The invention claimed is:

1. A method of operating intermittently a remote apparatus comprising a data system for capturing data, displaying data and/or actuating based on data, a wireless modem for communication with a mobile telecommunications network and a controller, the remote apparatus being able to communicate with a server through the mobile telecommunications network, the method comprising:
   (a) leaving the wireless modem switched off; and when data has been captured by the data system and is ready to send to the server and/or at intervals carrying out steps (b) to (d):
   (b) automatically, in the controller, switching on the wireless modem;
   (c) sending a signal from the remote apparatus to the server via the wireless modem and the mobile telecommunications network using a signaling channel message, wherein the signaling channel message is an unstructured supplementary services data, USSD, message including the data that is ready to send if the amount of data that is ready to send is less than the capacity of the signaling channel message; and
   (d) automatically in the controller switching off the wireless modem to release network resources and conserve power.

2. A method according to claim 1 including in step (d) waiting for a response message from the server before switching off the wireless modem.

3. A method according to claim 2, wherein in step (b) the controller causes the modem to send a location update message to a home location register,
   the home location register sends a message to the server; and
   the server generates the response message from the server in response to the message received from the home location register.

4. A method according to claim 2, wherein the response message is a message indicating whether the server has data to send to the remote apparatus, the method further comprising:
   if the message indicates that the server has no data to send to the remote apparatus, using the controller to switch off the wireless modem; or
   if the message indicates that the server has data to send to the remote apparatus, receiving the data from the server and then switching off the wireless modem.

5. A method according to claim 4 wherein the step of receiving the data from the server includes setting up a data channel between the remote apparatus and the server and completing data transfer through the data channel, before switching off the wireless modem.

6. A method according to claim 2, wherein the response message from the server includes a time indicating the current time and/or when the remote apparatus is next to communicate with the server, the method further comprising next carrying out steps (b) to (d) at the time indicated in the message.

7. A method according to claim 2, wherein the data system is a data capture system, including at least one of a location data capture system for capturing location data, such as a GPS system, a status reporting system for monitoring the status of vending systems, storage systems, remote dispensing or vending equipment or cold chain management systems, or a card reader.

8. A remote apparatus, for intermittently communicating with a server, the remote apparatus comprising:
   a data system for capturing data, displaying data and/or actuating based on data;
   a wireless modem for communication with a mobile telecommunications network that can be independently switched on and off; and
   a controller, arranged to control the wireless modem;
   wherein the controller is arranged to control the wireless modem to be normally switched off, the controller being arranged, when data has been captured by the data capture system and is ready to send to the server and/or at intervals:
      to control the remote apparatus to automatically switch on the wireless modem;
      to send a signal from the remote apparatus to the server via the wireless modem and the mobile telecommunications network using a signaling channel message, wherein the signaling channel message is an unstructured supplementary services data, USSD, message including the data that is ready to send if the amount of data that is ready to send is less than the capacity of the signaling channel message; and
      to automatically switch off the wireless modem to release network resources and conserve power.

9. A remote apparatus according to claim 8 wherein the controller is further arranged, after sending the signal, to wait for a response from the server (24) before switching off the wireless modem.

10. A remote apparatus according to claim 9 wherein the response is a message indicating whether the server has data to send to the remote apparatus, the controller being further arranged:
    if the message indicates that the server has no data to send to the remote apparatus (10), to switch off the wireless modem; or
    if the message indicates that the server has data to send to the remote apparatus, to receive the data from the server and then to switch off the wireless modem.

11. A remote apparatus according to claim 10 wherein if the message indicates that the server has data to send to the remote apparatus, the controller is arranged to set up a data channel between the remote apparatus and the server and to complete data transfer through the data channel, before switching off the wireless modem.

12. A network comprising a remote apparatus, for intermittently communicating with a server, the remote apparatus comprising:
    a data system for capturing data, displaying data and/or actuating based on data;
    a wireless modem that can be independently switched on and off; and
    a controller, arranged to control the wireless modem;
    wherein the controller is arranged to control the wireless modem to be normally switched off, the controller being arranged, when data has been captured by the data capture system and is ready to send to the server and/or at intervals:
       to control the remote apparatus to automatically switch on the wireless modem;
       to send a signal from the remote apparatus to the server via the wireless modem and the mobile telecommunications network using a signaling channel message, wherein the signaling channel message is an unstructured supplementary services data, USSD, message including the data that is ready to send if the amount of data that is ready to send is less than the capacity of the signaling channel message; and to automatically switch off the wireless modem to release network resources and conserve power;

and a server, wherein the server is arranged to store data for the remote apparatus; and on receipt of a signal from the remote apparatus through the signaling channel, the server is arranged to send a message back to the remote apparatus indicating whether the server has data to send to the remote apparatus, and if the message indicates that the server has data to send to the remote apparatus, to send the data to the remote apparatus.

13. A network according to claim 12 further comprising a home location register, the home location register being arranged to send a message to the server when the remote apparatus registers on the home location register, wherein the server is arranged to send a message back to the remote apparatus.

14. A method of intermittently operating a remote apparatus for communication with a server through a mobile telecommunications network, the method comprising:

(a) leaving a wireless modem at the remote apparatus switched off; and when data has been captured by the remote apparatus and is ready to send to the server carrying out steps (b) to (e):

(b) automatically, in a controller at the remote apparatus, switching on the wireless modem;

(c) sending a signal from the remote apparatus to the server via the wireless modem and the mobile telecommunications network using a signaling channel message, wherein the signaling channel message is an unstructured supplementary services data, USSD, message including the data that is ready to send if the amount of data that is ready to send is less than the capacity of the signaling channel message;

(d) sending a signal from the remote apparatus to the server via the wireless modem and the mobile telecommunications network using a conventional data link, including the data that is ready to send if the amount of data that is ready to send is greater than the capacity of the signaling channel message, and (e) automatically in the controller switching off the wireless modem to release network resources and conserve power.

* * * * *